United States Patent [19]

Blonstein

[11] Patent Number: 5,351,133
[45] Date of Patent: Sep. 27, 1994

[54] COLOR VIDEO DISPLAY WITH BUILT-IN COLOR DECOMPRESSION SYSTEM

[75] Inventor: Steve M. Blonstein, San Jose, Calif.

[73] Assignees: Ricoh Corporation, Menlo Park, Calif.; Ricoh Co., Ltd., Japan

[21] Appl. No.: 966,892

[22] Filed: Oct. 26, 1992

Related U.S. Application Data

[63] Continuation of Ser. No. 487,414, Mar. 1, 1990, abandoned.

[51] Int. Cl.5 .......................... H04N 1/41; H04N 1/46
[52] U.S. Cl. ..................................... 358/426; 358/453; 358/524; 358/527; 358/538
[58] Field of Search ............... 358/426, 453, 400, 401, 358/403, 479, 444, 75, 76, 78, 500, 524, 527, 538, 501

[56] References Cited

U.S. PATENT DOCUMENTS

| | | | |
|---|---|---|---|
| 4,792,856 | 12/1988 | Shiratsuchi | 358/426 |
| 4,814,898 | 3/1989 | Arimoto et al. | 358/426 |
| 5,033,106 | 7/1991 | Kita | 358/426 |
| 5,172,237 | 12/1992 | Blonstein et al. | 358/426 |

*Primary Examiner*—Edward L. Coles, Sr.
*Assistant Examiner*—Thomas D. Lee
*Attorney, Agent, or Firm*—Heller, Ehrman, White & McAuliffe

[57] ABSTRACT

Color video display apparatus with built-in color decompression includes, in one embodiment, a first holding buffer for storing compressed video data representative of a color video image. A decompression means decompresses the stored image data into a frame buffer. A video monitor provides for displaying a representation of the color video image from the frame buffer.

2 Claims, 9 Drawing Sheets

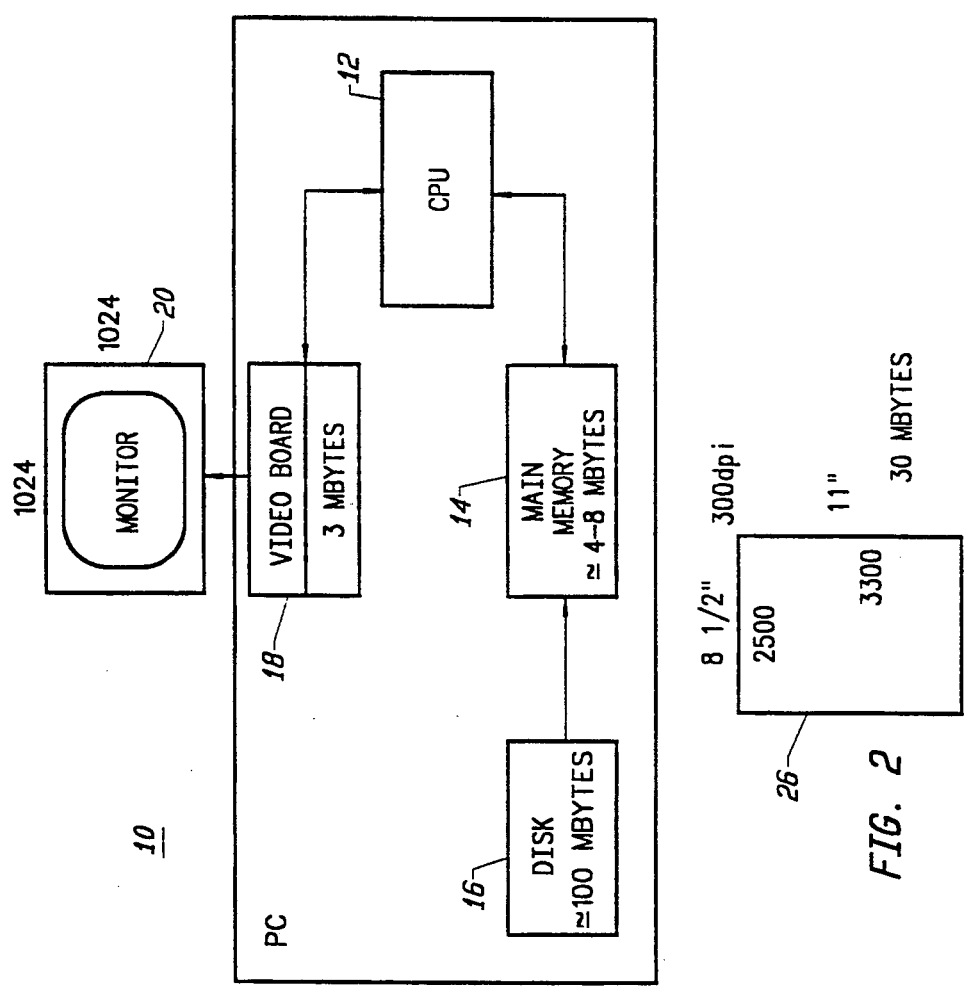

INDIVIDUAL PIXEL REPRESENTED BY
24 BITS OF DATA (TYPICALLY).

$$\begin{array}{rrrrr} 0 & -1 & -1 & -1 & 0 \\ -1 & 1 & 4 & 1 & -1 \\ -1 & 4 & 10 & 4 & -1 \\ -1 & 1 & 4 & 1 & -1 \\ 0 & -1 & -1 & -1 & 0 \end{array}$$

$$\begin{array}{c} Y \\ I \\ Q \end{array} = \begin{array}{ccc} a_{11} & a_{12} & a_{13} \\ a_{12} & a_{22} & a_{23} \\ a_{31} & a_{32} & a_{33} \end{array} \begin{array}{c} R \\ G \\ B \end{array}$$

| Y | Y | Y | Y |
| Y | Y | Y | Y |
| Y | Y | Y | Y |
| Y | Y | Y | Y |

FIG. 10C $I_{11}$  $I_{12}$
$I_{avg}$
$I_{21}$  $I_{22}$

```
              EXAMPLE
A  B          125  130
C  ?  /       102   ?   /
/  /  /        /    /   /
```

FIG. 12A     FIG. 12B

DELTA QUANTIZE TABLE

|  | Z |  |
|---|---|---|
| N1 |  | P1 |
| N2 |  | P2 |
| N3 |  | P3 |
| N4 |  | P4 |
| N5 |  | P5 |
|  | PN6 |  |

FIG. 13

Y DATA

|  | +1 |  |
|---|---|---|
| −5 |  | +7 |
| −13 |  | +17 |
| −27 |  | +37 |
| −55 |  | +63 |
| −89 |  | +93 |
|  | +127 |  |

FIG. 14A-1

I & Q DATA

|  | +1 |  |
|---|---|---|
| −3 |  | +5 |
| −11 |  | +13 |
| −23 |  | +25 |
| −45 |  | +47 |
| −81 |  | +83 |
|  | +129 |  |

FIG. 14A-2

Y DATA

|  | −1 |  |
|---|---|---|
| −7 |  | +5 |
| −15 |  | +15 |
| −29 |  | +35 |
| −57 |  | +61 |
| −91 |  | +91 |
|  | +127 |  |

FIG. 14B

COLOR VIDEO DISPLAY WITH BUILT-IN COLOR DECOMPRESSION SYSTEM

This is a continuation of application Ser. No. 07/487,414, filed Mar. 1, 1990, now abandoned.

The present patent application relates to co-pending application Ser. No. 445,387, filed Dec. 4, 1989, entitled HIGH QUALITY COLOR IMAGE COMPRESSION SYSTEM, and is assigned to the same assignee as the present invention.

BACKGROUND OF THE INVENTION

The present invention relates to color image compression apparatus and method as applied to uses in a color video display frame buffer.

True color video display boards are known in the prior art. True color refers to 24 bits per pixel, enabling the display to show up to 16 million different colors. These systems have traditionally been expensive due to the complexity of the electronics and requirement for large amounts of video RAM, which has traditionally been expensive. However, as the RAM price decreases and the demand for true color systems increases, there will be an ever increasing demand for 24-bit video display systems.

Several manufacturers provide 24-bit display systems for personal computers (PC). Most are designed to drive smaller (640×480) displays on up to the larger (1280×1024) devices. When displaying a 1280×1024×24 bit image, it can be seen why the frame buffer is almost 4 megabytes. One desirable feature that some companies offer is the "virtual" desktop. For example, say that you have scanned a color image at 300 dpi. The page size was, say, 8½×11. The image size then is 2400 dots by 3300 dots, yielding a 30-Megabyte image. The display is only 1280×1034 (best case). Clearly, it is possible to show only about one sixth of the image.

In order to see the rest, one way is to spool from disc the desired part of the image. The rest may be sitting in RAM in the main memory, but at 30 Mb per image, that is unlikely. Spooling will take seconds, maybe as many as twenty, and then if it is the wrong part of the image, you wait another twenty seconds.

Some manufacturers provide limited pixel depth to allow instant scrolling. By reducing the number of bits per pixel to, say, 12, one can double the image size held in the image buffer. However, now the image has only 12 pixel depth, and true color is no longer available. Further reductions can be made by going to 4 bits per pixel and getting the whole image in the buffer. Scrolling speed is very high because it is just a matter of indexing to the right part of the buffer and outputting the values.

SUMMARY OF THE INVENTION

It is an object of the present invention to provide an improved color image compression apparatus and method as applied to uses in a color video display frame buffer.

True color images can be compressed to 3 to 4 bits per pixel and remain indistinguishable from the original. The present invention spools the full 24 bit color image from the disk to a video board that contains a compression chip, or spools an already compressed file to a temporary buffer called the "holding buffer."

This buffer would typically be the size of a regular frame buffer and would hold the entire image in its compressed form. Between the holding buffer and the "real frame buffer" would be a decompression chip. On demand, and at very high speed, the decompression chip indexes to a certain part of the whole image and decompresses that section of the image into the real frame buffer. Because no PC bus is involved and no spooling from the disk is required, the screen can be updated in just a couple of seconds. Mistakes of scrolling would be unimportant because of the speed of the decompressor. Another feature is that the holding buffer would use slow memory, because it would only be accessed during update time.

A typical example would be a 1280×1024 monitor with the normal 4 MB video RAM frame buffer. In order to store a 300 dip full page image at 3 bits per pixel, it would require a temporary holding buffer of about 3 Megabytes (slow speed DRAM). This additional memory would allow the user to instantly scroll to anywhere in the image.

Other objects, features and advantages of the present invention will become apparent from the following detailed description when taken in conjunction with the accompanying drawings.

BRIEF DESCRIPTION OF THE DRAWINGS

The accompanying drawings which are incorporated in and form a part of this specification illustrate an embodiment of the invention and, together with the description, serve to explain the principles of the invention.

FIG. 1 depicts a block diagram of a prior art color image apparatus.

FIG. 2 depicts a diagram of image on a normal size document.

FIGS. 10A, 10B, 10C and 10D depict spatial reduction of the YIQ color planes.

Figures 11, 12A, 12B:
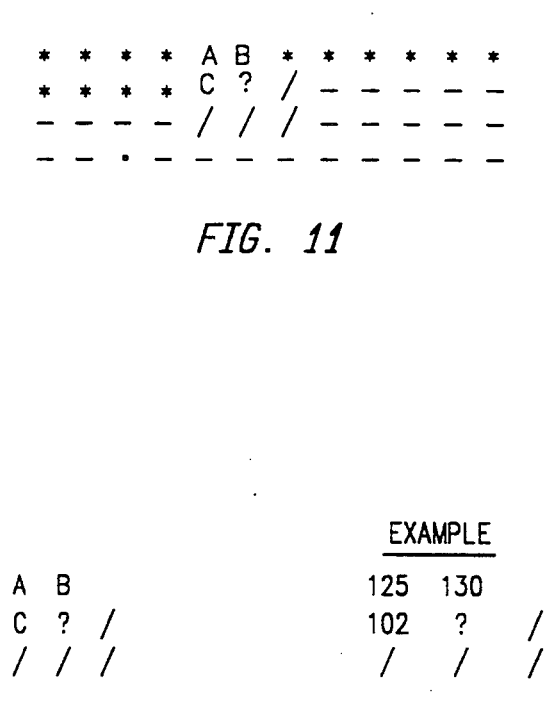

FIG. 11 depicts a series of pixels after spatial reduction.

FIG. 12 depicts an illustration of a particular set of pixel values about to be delta quantized.

FIG. 13 depicts a delta quantized table.

FIGS. 14 and 14A depict typical values of a delta quantized table used for Y, I and Q data.

DETAILED DESCRIPTION OF THE DRAWINGS

Figure 3:
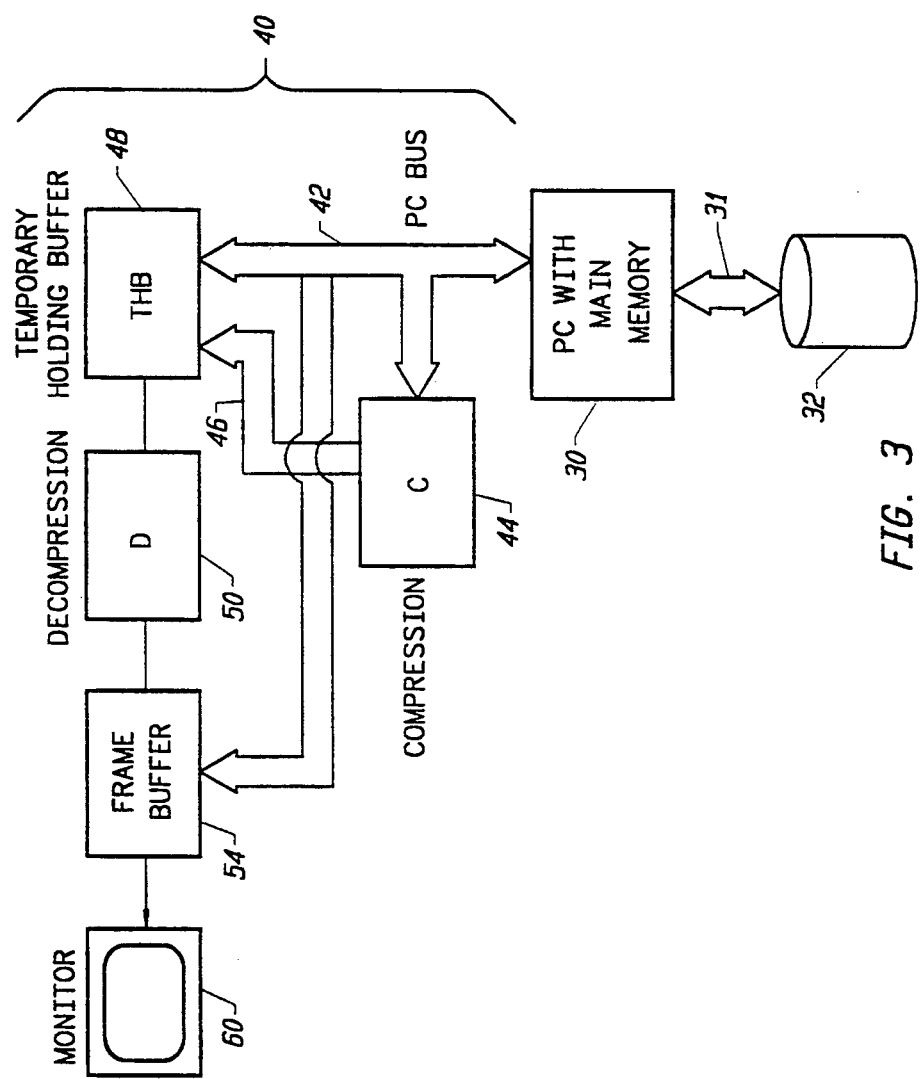
FIG. 3 depicts a block diagram of a color image compression/decompression apparatus according to the present invention.

Reference will now be made in detail to the preferred embodiment of the invention, an example of which is illustrated in the accompanying drawings. While the invention will be described in conjunction with the preferred embodiment, it will be understood that it is not intended to limit the invention to that embodiment.

On the contrary, it is intended to cover alternatives, modifications and equivalents as may be included within the spirit and scope of the invention as defined by the appended claims.

Referring now to FIG. 1, a color image apparatus according to the prior art is shown for purposes of describing prior art deficiencies.

The prior art apparatus 10 in FIG. 1 includes a CPU 12 and main memory 14 that can address typically 4-8 Megabytes. Disk drive 16 provides for memory of approximately 100 Megabytes.

The apparatus 10 of FIG. 1 also includes a video frame buffer 18 board which normally has a frame buffer of its own, and provides 3 Megabytes that drive a color display monitor 20 which has a resolution of 1024 × 1 024 dots.

FIG. 2 shows the dimension of a typical color scan dimension 26 of approximately $8\frac{1}{2} \times 11$ inches, which is 300 dots per inch and requires approximately 30 Megabytes of data. The configuration 26 of FIG. 2 is roughly 2500 dots horizontally by 300 dots vertically.

It is clear from FIG. 2 that it is not possible in full scale to show an entire image in the monitor display at one time. In order to pan around the image, it is necessary to continuously spool of a hard disk drive into main memory and onto the video board in order to display the rest of the image.

Prior art approaches include virtual imaging, which enables a suer to opt for a lower number of bits per pixel which gives less variations, or possibilities, of color. In doing so, more of the image can be fit into the video board's frame buffer, making panning around the image much faster. Typically, for the 30 Megabyte image, when one gets down to 4 bits pr pixel, most of the image can be fit into the frame buffer. (Most of the image is now fitting in the video board.) But with only 4 bits per pixel, one only has 16 colors, which is not useful in a true color system, where you need 16 million colors.

FIG. 3 shows one preferred embodiment of the present invention. In FIG. 3, a PC 30 with main memory is connected to a mass storage device 32. The mass storage device 32 can hold either original full 24-bit pixel images or compressed images that are roughly 2-3 bits per pixel. Card 40 is shown surrounded by a dotted line, and the images can go to one of two places.

A full 24-bit image could be passed through compression block 44, which is a compression chip, and then from there into the temporary holding buffer 48.

A compressed image could be passed directly across the bus 42 to the temporar holding buffer 48. In order to display an image, the relevant part of the compressed image is decompressed through decompression block 50 into the frame buffer 54 and displayed on the monitor 60. Alternatively, if desired, the original image can be displayed directly by passing data across the PC bus 42 into the frame buffer 54 and on to the monitor 60.

Figure 4:
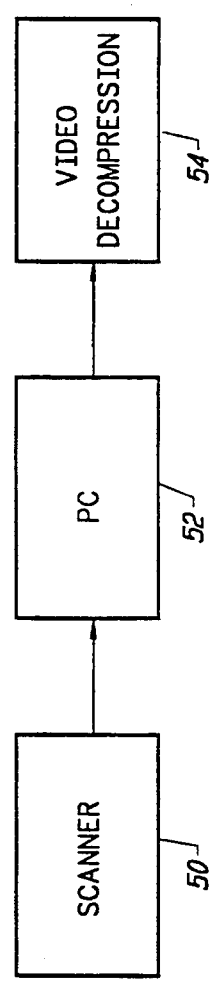
FIG. 4 depicts a block diagram of a further embodiment of the present invention.

FIG. 4 shows a further aspect of the present invention, which includes a scanner 50 with built-in compression ratio of, say, 10:1 compression. This compressed data can be passed to a PC 52 that directly writes the image data into the video decompression circuit 54 of FIG. 3.

Figure 5:
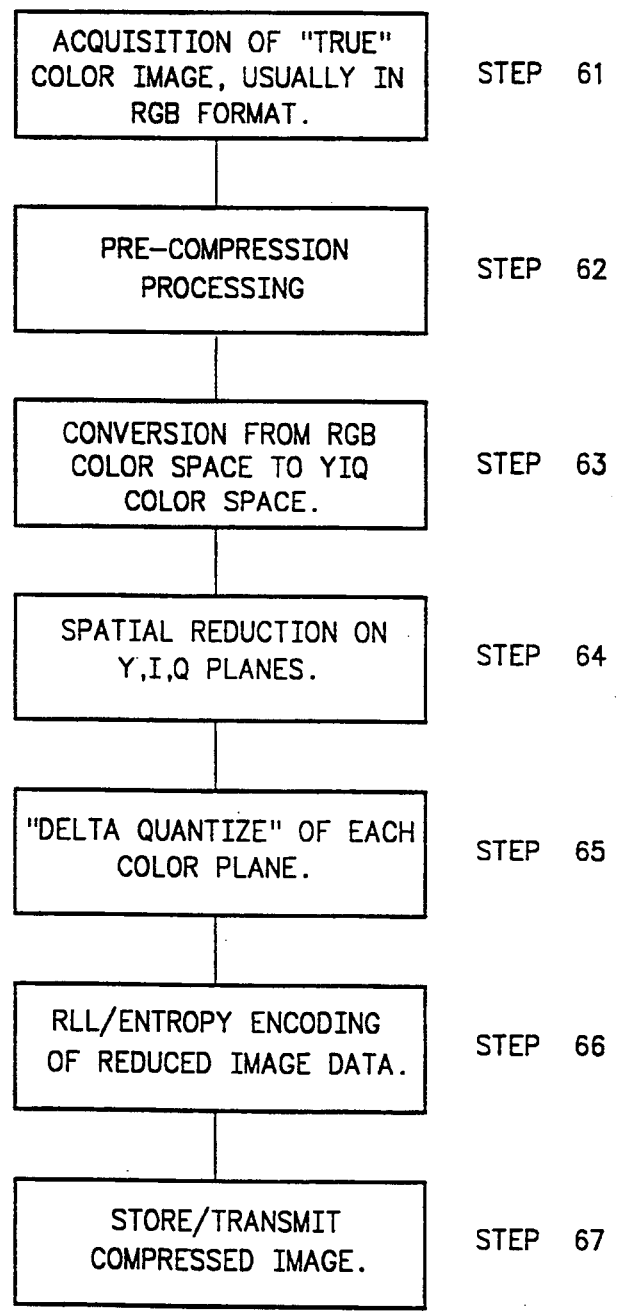
FIG. 5 depicts a color image compression flow chart which could be utilized with the present invention.

Suitable compression and decompression techniques utilized with the present invention could be those described in the cross-referenced application entitled "High Quality Color Image Compression System," the details of which are hereby incorporated by reference. The compression and decompression algorithms described in that co-pending application are now described below:

Referring now to FIG. 5, a color image compression flow chart which could be Utilized with the present invention is depicted. The color image compression flow chart of FIG. 5 illustrates the sequence of steps from acquiring the color image to providing the storing and transmission of the compressed color image.

In FIG. 5, the first step 61 includes the acquisition of a "true" color image, usually in a RGB (red, green, blue) format. The acquisition of color image data in an RGB format is a well known technique.

The next step 62 includes the step of precompression processing.

The next step 63 provides the conversion from RGB color space to YIQ color space, which is also a known technique.

The next step 64 provides spatial reduction on the YIQ color space (on the YIQ planes).

Step 65 provides for a delta quantizing of each of the YIQ color planes, as will be described in further detail below.

Step 66 provides the step of run length limited (RLL) and entropy encoding of the reduced image data.

Finally, step 67 includes the step of storing and transmitting the high quality color compression image data according to the present invention.

Further details and aspects of the color image compression flow chart of FIG. 5 will be described in more detail in connection with the remaining Figures.

Figure 6:
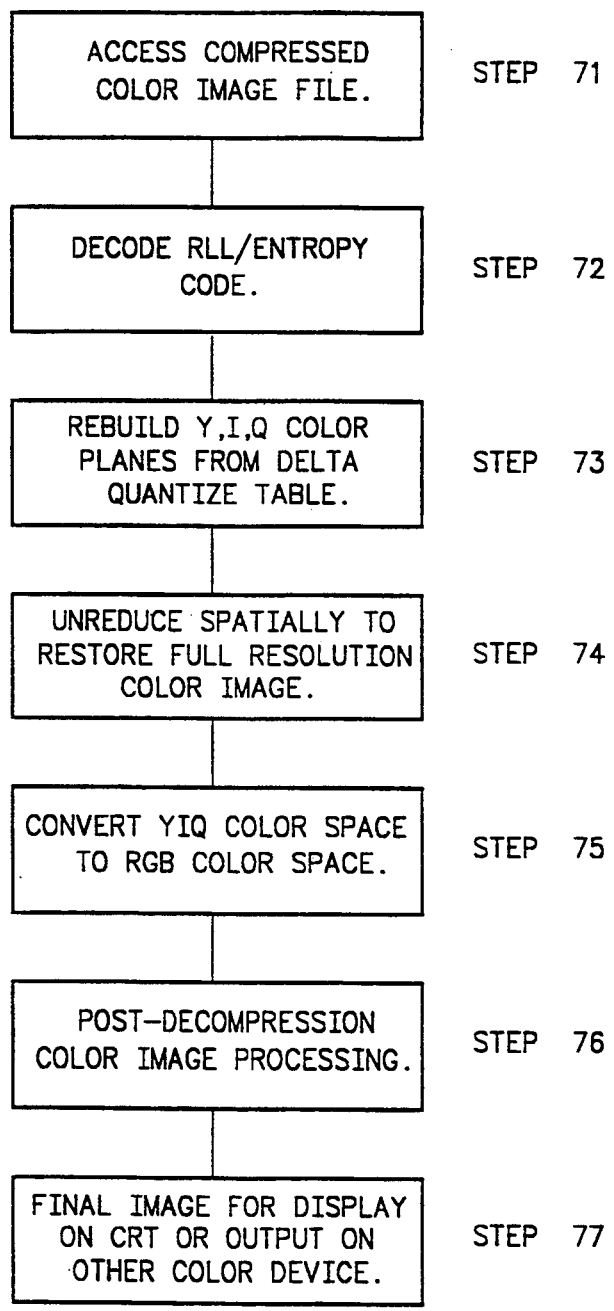
FIG. 6 depicts a color image decompression flow chart which could be utilized with the present invention.

Similarly, FIG. 6 depicts a color image decompression flow chart according to the present invention.

In Step 71, the decompression algorithm accesses the compressed color image file.

In Step 72, the decompression algorithm decodes the run length limited/entropy code of the compression algorithm.

At Step 73, the decompression algorithm rebuilds the YIQ color planes from the delta quantized table.

At Step 74, the decompression algorithm reverses (expands) the spatial reduction to restore full resolution color image of the compressed color images.

At Step 75, the decompression algorithm converts the YIQ color space to RGB color space.

Step 76 provides post decompression color image processing according to the decompression algorithm.

Finally, at Step 77, the final image which is decompressed is displayed on a CRT or output on another color device.

Referring now to FIGS. 7-14, the more detailed aspects of the decompression algorithm of FIG. 5 will now be described in more detail.

Figures 7, 8, 9:
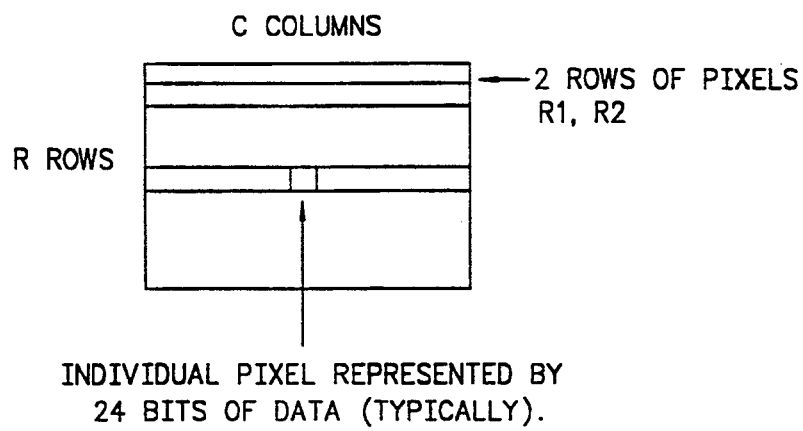
FIG. 7 depicts a sample image illustrating the acquisition of true color image.
FIG. 8 depicts a kernel representation which could be utilized in the present invention.
FIG. 9 depicts a conversion from RGB to YIQ color space.

FIG. 7 shows a sample color image with parameters to describe a sample image representation. FIG. 7 depicts the acquisition of true color image, usually in RGB format, which is Step 61 in FIG. 5. In FIG. 7, the total number of pixels in a color image is given by R rows and C columns. Each pixel is typically represented by 24 bits of data ("true" color). The 24 bits of data is typically broken down to eight bits each for red, green and blue (RGB). The color image can be from a plurality of input sources such as a color scanner, mass storage device, video capture device, and the like. Some prior art approaches require the whole image to be buffered before color processing may start. Other types require eight lines or sixteen lines to be buffered. The present invention provides for color image compression on a minimum of just two lines of pixel data, e.g., R1, R2 from FIG. 7. This minimizes the buffer requirements in contrast with other prior art approaches.

The pre-compression processing Step 62 of FIG. 5 will now be described in more detail. Before any compression takes place, it is often desirable to pass a convolution across the color image. The present high quality color compression technique according the present invention is improved if the image is pre-filtered by a convolution that performs both edge enhancement and a certain degree of smoothing. An example of such a kernel is illustrated in FIG. 8. It should be noted that 3×3 or 5×5 convolutions can be applied. The number illustrated in FIG. 8 serves only as an example. Kernels are normally, but not necessarily, symmetric.

The Step 63 conversion from RGB color space to YIQ color space will now be described in more detail.

The standard RGB format desirably is converted to YIQ color space. Standard linear transformations are used, one of which is depicted in FIG. 9. The transformation may be accomplished through the use of lookup tables as opposed to matrix multiplication. The transformation to YIQ color space provides the ability to perform spatial resolution reduction on each plane (each YIQ plane) individually. Typically, the Q plane can be spatially reduced more than the I plane, which can be reduced more than the Y plane.

Step 64 of spatial reduction on the YIQ planes of FIG. 5 will now be described in more detail.

Spatial reduction is applied to each of the three planes (YIQ planes), depending upon the compression ratio required or desired. For very high quality results, but relatively low compression ratio (about eight bits per pixel), no spatial reduction need be used. For around three to four bits per pixel, the scheme depicted in FIGS. 10A, 10B and 10C might be utilized.

In FIG. 10A, no spatial reduction is used on the Y plane. In FIG. 10B, a 2:1 spatial reduction is utilized on the I plane. In FIG. 10C, a 4:1 reduction is utilized on the Q plane.

The method used to get the average value may be varied. For example, the average of the I plane pixel may be depicted, as in FIG. 10D, and it is desired to determine what is $I_{avg}$. It is possible to use the following calculations:

1) $I_{avg} = I_{11}$
2) $I_{avg} = (I_{11} + I_{12} + I_{21} + I_{22})/4$
3) Some other weighted average of surrounding pixels The delta quantizing Step 65 of each color plane (YIQ planes) will now be described in more detail. Consider the example depicted in FIG. 11, which shows a series of pixels, after spatial reduction. The illustration represents one of the three color planes (YIQ). Assume that the data in FIG. 11 is from the Y plane, where the ABC pixels are previously processed pixels, the "?" is the current pixel under examination, and where the "-", "/" are yet unprocessed pixels, and where the "/" indicates that error diffusion will be applied. In FIG. 11, the "A" pixel is proximate to the "?" pixel, being within the scan line above and left of the "?" pixel. Similarly, the "B" pixel is directly or immediately above the "?" pixel, and the "C" pixel is proximate (directly left) of the "?" pixel.

In order to understand the aspects of the present invention, consider one particular set of values to be delta quantized as depicted in FIG. 12. Focus in on one of the eight pixels of most interest in FIG. 11 and assign hypothetical values as illustrated in FIG. 12.

In FIG. 12, the numbers 125, 130 and 102 have already been quantized. Assume that the prequantization value for "?" is 147. The first task is to decide from which pixel to "delta quantize." The present invention utilizes a method which calculates the absolute difference of (B−A) and (C−A). Whichever absolute difference is greater, the "?" pixel is quantized from that one pixel. In the example of FIG. 12, 102 is clearly further from 125 than 130. Thus, the "?" pixel is quantized from 102.

FIG. 13 depicts a representation of a delta quantized table. The delta quantized table is an asymmetric non-linear quantized table, different for each of the YIQ planes. A quantized table can be made up of various delta quantized values, say 12, in one preferred embodiment. These delta quantized values are represented in FIG. 13.

In FIG. 13, the N stands for negative, the P stands for positive. Note that any number of values could be used, although the 12 value is the one preferred embodiment.

In FIG. 13, the table is asymmetric, i.e., ABS(N3-N2) is not necessarily equal to ABS(P3-P2). The reason for this is that the human eye perceives small decreases in intensity more easily than small increases.

The table in FIG. 13 is also non-linear, i.e., $(N_x - N_{x-1})$ greater than symbol $(N_{x-1} - N_{x-2})$. Again, this attributed to the human eye characteristic that large intensity changes are easily perceived, but that the magnitude is hard to judge. Thus, more values can be assigned to the more critical "small" steps.

FIGS. 14 and 14A depict typical tables used for Y, I and Q data.

Another feature which could be utilized with the present invention is to use delta quantize tables that change between odd and even pixel numbers. For example, for the first pixel in a line, use the table in FIG. 14. Then, when doing the second pixel in the line, move the values slightly, as shown in FIG. 14A.

A similar thing can be done to the I and Q data. This improves the compression considerably. The main reason is that the value of the Z token now stretches form +1 to −1 from pixel to pixel. This provides a so-called "wide zero" effect, resulting in longer runs of Z tokens and subsequently greater compression ratios.

For pixels 1, 3, 5, 7, etc., use the table in FIG. 14 as the delta quantize table. For pixels 2, 4, 6, 8, etc., use the table in FIG. 14A. Given the example delta quantized table, it is now possible to complete the example of FIG. 12.

Using the fact that 102 is a greater distance from 125 than 130, the "?" pixel's prequantized value is 147 as a delta of +45. Looking at FIG. 14, +45 is closest to the P3 value which is assigned +37. Thus, the delta quantized value of "?" becomes 102+37, i.e., 139.

An error on the "?" pixel of negative eight was introduced. It is possible to limit the effect of the quantization error by error diffusing the difference to neighboring unquantized pixels. The four "/" pixels are, for example, increased by two (if the error is to be fully distributed).

Some special cases should be addressed at this time.
1) Border conditions are set so that the pixels have values 128, so that there is always something to quantize from.
2) If a "?" pixel data is exactly halfway between two table values, one of two possibilities may occur.

The first is to randomly round the value up or down, but never in the same direction at all times. This could lead to chromatic distortions. Secondly, the delta quantized table should be set so that the above scenario cannot occur. This is achieved by making all ($P_x-P_{x-1}$) and ($N_x-N_{x-1}$) even.

The RLL/entropy encoding Step 66 of FIG. 5 will now be described in more detail below.

The tables shown in FIGS. 14 and 14A tend to lead to occurrences of the zero value. Many of these occur in runs. Significant gains in coding result because of this phenomenon, P1 and N1 are considered the highest probability to occur. They receive the most privileged tokens A1 and B1. The decision has to be made which of these two received the 00 code and which the 01 code. A good method seems to be to choose the one that is closest to zero.

A sample RLL/entropy table is shown below in Table I:

TABLE I

| | |
|---|---|
| 00 = | B1 (if after Z) |
| 000 = | Isolated Z |
| 001 = | B1 (if not after Z) |
| 01 = | A1 |
| 10f = | N2/P2 |
| 110f = | N3/P3 |
| 1110f = | N4/P4 |
| 11110f = | N5/F5 |
| 11101100 = | PN6 |
| 1110111{1}0w = | N*16 + 9 + W consecutive Zeros |
| 1111{1}0 = | N + 2 consecutive Zeros | where:
- f = a single bit (0 = N; 1 = P)
- w = 4 bits, evaluated as number W = 0–15
- {1} = N consecutive 1's The store and transmit compression image Step 67 of FIG. 5 will now be described in more detail.

FIG. 6 shows a decompression sequence which could be utilized with the present invention. It follows the reverse sequence of the compression algorithm of FIG. 5.

The raw compressed file is taken and the RLL/entropy table is used to generate the values Z, N1, P1, etc., for the entire image.

Color planes are rebuilt using the reverse process that the delta quantizer used. For example:

| Y data | | | |
|---|---|---|---|
| 130 | 137 | 132 | 169 |
| 131 | P1 | N1 | P2 |

Consider the P1 value above. Because 137 is "further" from 130 than 131, it must have been delta quantized from 137. Thus, replace the P1 with 137+7 (taken from P1 in FIG. 10) =144.

| | | | |
|---|---|---|---|
| 130 | 137 | 132 | 169 |
| 131 | 144 | N1 | P2 |

Now the N1 uses the 144 due to the fact that 144 is further from 137 than 132. Thus, replace N1 by 144−7=137 (taken from N1 in FIG. 14A), and so on.

Once complete, this process leaves a full image that is complete except for any spatial "unreduction" that might be needed.

Spatial "unreduction" will depend upon the method that was used to do the original reduction. Referring to Step 74, if $I_{avg}=I_{11}$, then replace all missing pixels with $I_{11}$. If $I_{avg}$ was the average of four pixels, then the average is used to replace all missing pixels. More sophisticated schemes may be used to limit error sizes.

With all color planes restored to full resolution, YIQ can be converted back to RGB color space.

Smoothing/sharpening filters may be applied to the new image to remove unwanted characteristics of the compression/decompression stages.

The foregoing description of a preferred embodiment of the invention has been presented for purposes of illustration and description. It is not intended to be exhaustive or to limit the invention to the precise form disclosed, and obviously many modifications and variations are possible in light of the above teaching. The present embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for sequential display of a first region and a second region of a true-color high-resolution image on an image display means, said image display means comprising a video display monitor having an array of display pixels, said image being stored as compressed image data in a memory means, comprising the steps of:

(a) decompression of a portion of said compressed image data substantially corresponding only to said first region of said image to provide a first decompressed data package;

(b) storage of said first decompressed data package in a first portion of a frame buffer means, the storage capacity of said first portion of said frame buffer means being approximately equal to at least the size of said first decompressed data package and less than the size of the entirety of said compressed image data when decompressed;

(c) display of said first decompressed data package in said frame buffer means on substantially the entirety of said display pixels of said video display monitor;

(d) decompression of a portion of said compressed image data substantially corresponding only to said second region of said image to provide a second decompressed data package, said first region and said second region having substantially equal size;

(e) storage of said second decompressed data package in a second portion of said frame buffer means, the storage capacity of said second portion of said frame buffer means being approximately equal to at least the size of said second decompressed data package; and (f) display of said second decompressed data package in said frame buffer means on substantially the entirety of said display pixels of said video display monitor.

2. The method of claim 1 further including the steps, prior to Step (a), of:

spooling uncompressed image data from a storage means to a compression means;

compressing said uncompressed true-color high-resolution image data at said compression means to provide said compressed image data; and storing said compressed image data in said memory means.

* * * * *